United States Patent [19]

Reinhardt

[11] Patent Number: 5,697,580
[45] Date of Patent: Dec. 16, 1997

[54] INFANT TRANSPORTING MEANS FOR AIRPLANES

[75] Inventor: John W. Reinhardt, Mays Landing, N.J.

[73] Assignee: The United States of America as represented by the Secretary of Transportation, Washington, D.C.

[21] Appl. No.: 861,139

[22] Filed: May 21, 1997

Related U.S. Application Data

[63] Continuation-in-part of Ser. No. 533,486, Sep. 25, 1995, abandoned.

[51] Int. Cl.[6] ................................................. B64D 11/00
[52] U.S. Cl. ....................... 244/118.5; 244/118.6; 5/655
[58] Field of Search ................ 244/118.5, 118.6; 119/453, 454, 496, 497, 400, 403; 5/655, 118, 94

[56] References Cited

U.S. PATENT DOCUMENTS

| | | | |
|---|---|---|---|
| 2,124,003 | 7/1938 | McDonnell et al. | 244/118.6 |
| 2,777,138 | 1/1957 | Gallagher | 5/655 |
| 3,240,450 | 3/1966 | Skarott | 244/118.5 |
| 3,370,813 | 2/1968 | Albertine et al. | 244/118.5 |
| 4,589,612 | 5/1986 | Halim | 5/118 |
| 4,977,630 | 12/1990 | Oswalt et al. | 5/655 |
| 5,016,570 | 5/1991 | Henson | 119/497 |
| 5,078,343 | 1/1992 | Howlett | 244/118.5 |
| 5,431,129 | 7/1995 | Clark . | |

FOREIGN PATENT DOCUMENTS

| | | | |
|---|---|---|---|
| 1243499 | 8/1971 | United Kingdom | 119/453 |

*Primary Examiner*—Andres Kashnikow
*Assistant Examiner*—Tien Dinh
*Attorney, Agent, or Firm*—Otto M. Wildensteiner

[57] ABSTRACT

A means for transporting an infant on an airplane wherein the infant is placed in an infant supporting device or carrier which is then placed in a modified overhead bin. The modifications to the bin include a transparent cover having ventilation holes, a source of cabin air, a light, an oxygen mask, and means to secure the infant supporting device with the bin. This allows the infant to be in a secure location in the event of severe turbulence, and allows the parents to enjoy the flight without worrying about the infant's safety.

12 Claims, 1 Drawing Sheet

INFANT TRANSPORTING MEANS FOR AIRPLANES

This is a continuation in part application of application Ser. No. 08/533,486 filed Sep. 25, 1995, now abandoned.

STATEMENT OF GOVERNMENT INTEREST

The present invention may be made or used by or on behalf of the Government of the United States for governmental purposes without the payment of any royalties thereon or therefor.

BACKGROUND

At the present time there is no preferred means or method for carrying an infant on a commercial airplane except in its parent's arms. Even purchasing a separate seat next to the parents is not a real solution, since the infant is too small to be belted in and there is no harness or other device that can be used to "adapt" the infant to the belt. Even if there were such an "adapter", most parents would object to buying another ticket just for the infant.

Placing the infant in an automobile-type infant seat which is then belted to the airplane seat has appeal, but it also has the drawback of requiring that the parents purchase a separate ticket for the infant.

Carrying the infant in its parent's arms is not a totally satisfactory solution since the child gets in the way when meals are served. Furthermore, when the parent has to get up or when another passenger has to go past the parent, the lack of legroom in an airplane makes maneuvering with an infant even more difficult than it normally is.

In the event of severe turbulence an infant poses even more of a problem for the parents. If the parent were to place the infant within its (the parent's) seat belt, the weight of the parent would crush the infant against the belt. If the parent were to hold the infant in his or her arms, the force of the inertia of the infant would probably tear the infant from the parent's arms. The infant would then pose a danger not only to itself but to the other passengers as well.

What is needed is a way of carrying an infant in a safe and economical manner that allows the parents to enjoy the flight knowing that their infant is safe.

OBJECTS

Accordingly, it is an object of the present invention to provide a means of carrying an infant on an airplane that assures maximum safety for the infant.

It is a further object to provide such a means at minimum cost both to the airline and to the parents.

It is a further object to provide such a means that requires minimum modifications to the airplane.

SUMMARY

Briefly, the present invention is an overhead-bin that has been modified to be an infant transporting means. The bin has a transparent door so that the infants within can be seen by the cabin crew and parents; the door also has air circulation holes so that the infant receives fresh air. The modified overhead bin includes a light, an air vent nozzle, and an oxygen mask to provide a safe and comfortable environment. In use, the infant is first placed in a carrier or infant supporting device much like the infant carrier/seats presently used in automobiles. This carrier is designed to be locked into the overhead bin, preferably by a latching means rather than by a seat belt as in an automobile. After the carrier is latched in place, the bin door is closed. The infant is then in a safe and secure area where it will not be injured by objects flying around the cabin in the event of severe turbulence, nor will it be in danger of being thrown about within the cabin in the event of a crash.

DESCRIPTION OF THE PREFERRED EMBODIMENT

Figure 1:
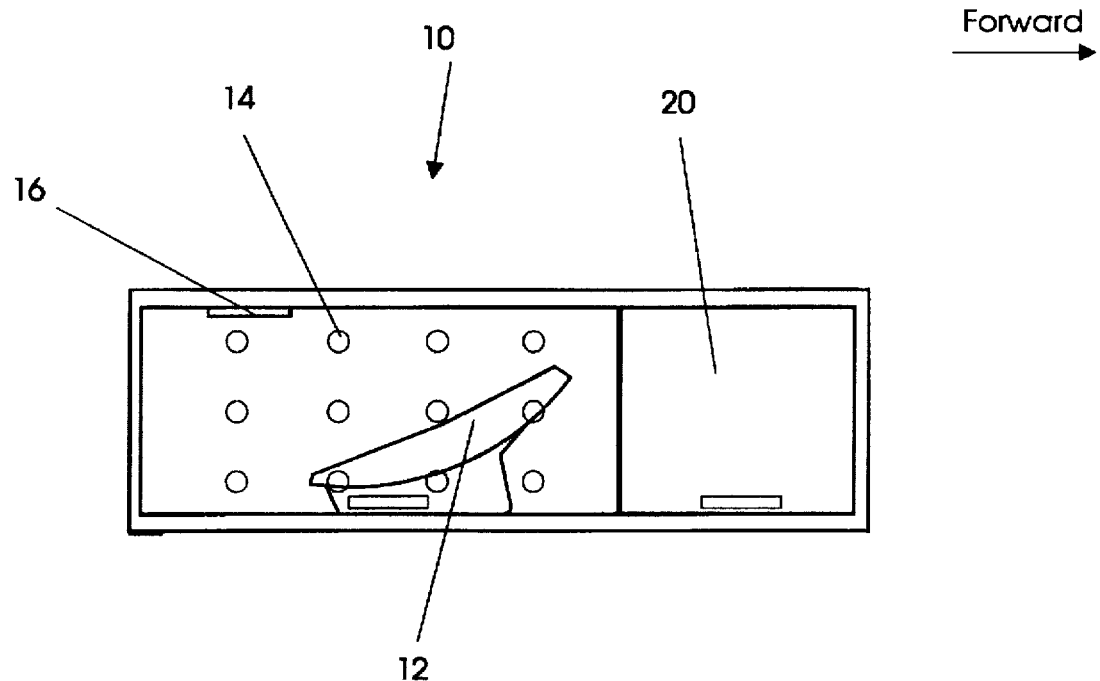
FIG. 1 shows an overhead bin modified to accommodate a single infant.

FIG. 1 shows a modified overhead bin 10 that accommodates a single infant in a carrier 12. Carrier 12 can be any type or design of infant supporting device as long as it is approved for use in a vehicle, fits within modified bin 10, and has attachment hardware that is compatible with the attachment points within overhead bin 10. Carrier 12 is shown facing rearward, since this is the currently preferred orientation for automobile-type carriers because it distributes crash deceleration forces along the infant's whole body. However, it could be oriented in any direction.

Although a seat belt type attachment (as is currently used to hold an infant carrier in an automobile) could be used to fix infant carrier 12 within the bin, it is not a very quick or efficient method. A quick-release coupling is preferable since it will allow the infant carrier to be removed in a minimum of time, thereby resulting in minimum blockage of the aisle by the parents when removing the infant upon landing. A quick-release coupling also allows the infant to be placed in the bin more quickly than a seat belt type attachment, which reduces aisle blockage while getting ready for takeoff.

The door to bin 10 should have ventilation holes 14 in it for circulation of fresh air, which is supplied by personal service unit 16. Personal service unit 16 contains a nozzle which supplies cabin air, a light, and an emergency oxygen mask. Obviously the light should not be a spotlight as are the passenger lights in the main cabin, since such a light shining on the infant's face could awaken him/her. However, a light is necessary in order to be able to check on the infant's condition during the flight; the switch is preferably outside the bin.

Preferably the door to bin 10 is transparent. This allows the cabin attendants and parents to look in on the infant from time to time without raising the door and possibly disturbing the infant. It also allows the infant to see a certain amount of activity, which may be helpful in keeping the infant from feeling isolated.

Figure 2:
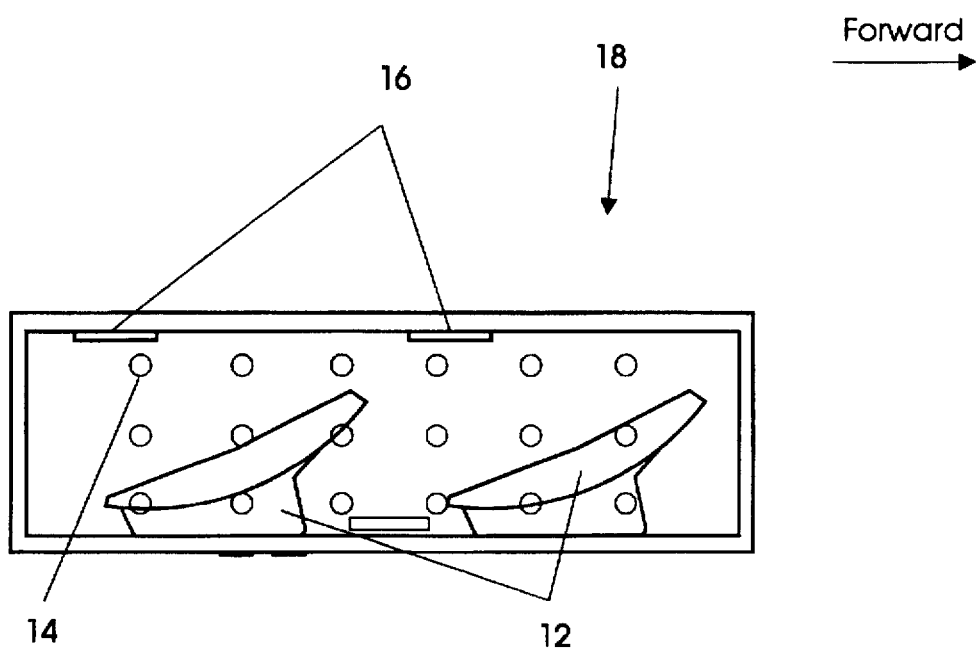
FIG. 2 shows an overhead bin modified to accommodate two infants.

FIG. 2 shows a bin 18 that has been modified to hold 2 infants. All design details of bin 18 are the same as bin 10 except for the fact that bin 18 has means for fixing 2 infant carriers 12 within it instead of just 1 and has 2 personal service units 16, one for each infant.

Preferably the means for attaching the infant carrier to the bin is flush with the inside of the bin when no infant is in the bin. This allows the bin to be used as a conventional overhead bin without the possibility of a passenger snagging his or her article of clothing or luggage on the attaching means as it is being put into or taken out of the bin. It also prevents the attaching means from being damaged if a heavy briefcase is slammed into the bin.

FIG. 1 also shows an optional small luggage compartment 20 that is left over when an overhead bin is modified to accept only one infant carrier 12. This could be used for holding the infant's supplies such as a diaper bag, etc.

I claim:

1. A transporting means for an infant in an airplane, said transporting means comprising a conventional overhead storage bin, a door on said overhead bin, ventilation holes in said door, and means in said overhead bin for releasably securing an infant supporting device.

2. A transporting means as in claim 1 wherein said door is transparent.

3. A transporting means as in claim 2 further including a source of cabin air.

4. A transporting means as in claim 3 further including a light.

5. A transporting means as in claim 4 further including an oxygen mask.

6. The method of transporting an infant in an airplane, said airplane having a conventional overhead storage bin with a closable door, which comprises placing said infant in an infant supporting device and releasably securing said infant supporting device in said overhead bin.

7. The method of claim 6 further including closing said door.

8. A transporting means for a plurality of infants in an airplane comprising a conventional overhead storage bin, a door on said overhead bin, ventilation holes means in said bin for releasably securing a plurality of infant supporting devices.

9. A transporting means as in claim 8 wherein said door is transparent.

10. A transporting means as in claim 9 further including a plurality of sources of cabin air.

11. A transporting means as in claim 10 further including a plurality of lights.

12. A transporting means as in claim 11 further including a plurality of oxygen masks.

\* \* \* \* \*